United States Patent [19]

Miyatake

[11] Patent Number: 4,776,019
[45] Date of Patent: Oct. 4, 1988

[54] DIAPHRAGM FOR USE IN CONDENSER MICROPHONE TYPE DETECTOR

[75] Inventor: Kimio Miyatake, Kyoto, Japan

[73] Assignee: Horiba, Ltd., Kyoto, Japan

[21] Appl. No.: 49,146

[22] Filed: May 13, 1987

[30] Foreign Application Priority Data

May 31, 1986 [JP] Japan .................... 61-128930

[51] Int. Cl.⁴ ............................................ H04R 23/02
[52] U.S. Cl. ........................... 381/174; 181/158
[58] Field of Search ............... 381/168, 174, 191, 202, 381/203; 181/157, 158; 250/343, 344

[56] References Cited

U.S. PATENT DOCUMENTS

3,925,667 12/1975 Staab ........................... 250/344 X
4,180,732 12/1979 Fabinski et al. ............... 250/344

Primary Examiner—L. T. Hix
Assistant Examiner—Brian W. Brown
Attorney, Agent, or Firm—Wenderoth, Lind & Ponack

[57] ABSTRACT

A diaphragm for use as a pressure receiving and dislocatable member in a condenser-type microphone detector. The diaphragm electrode is a thin metallic film member having a central movable portion, a supporting frame portion around the outside of and spaced from the central movable portion, and at least three supporting spring portions at equal intervals around the periphery of the central movable portion and connected between the central movable portion and the supporting frame portion for permitting the central movable portion to be moved out of the plane of the supporting frame portion by differential pressure across the opposite sides of the central movable portion. The central movable portions can have holes therein for partly relieving the pressure thereon.

8 Claims, 8 Drawing Sheets

DIAPHRAGM FOR USE IN CONDENSER MICROPHONE TYPE DETECTOR

BACKGROUND OF THE INVENTION

1. Field of the Invention

The present invention relates to a diaphragm forming at least one electrode of a condenser functioning as a differential pressure-detecting sensor in a condenser-type microphone detector mounted in, for example, a non-dispersive infrared analyzer for analyzing a gas and the like. The diaphragm is used as a pressure-receiving and dislocating member, which receives a pressure which causes it to be transformed and dislocated.

2. Description of the Prior Art

Figure 12:
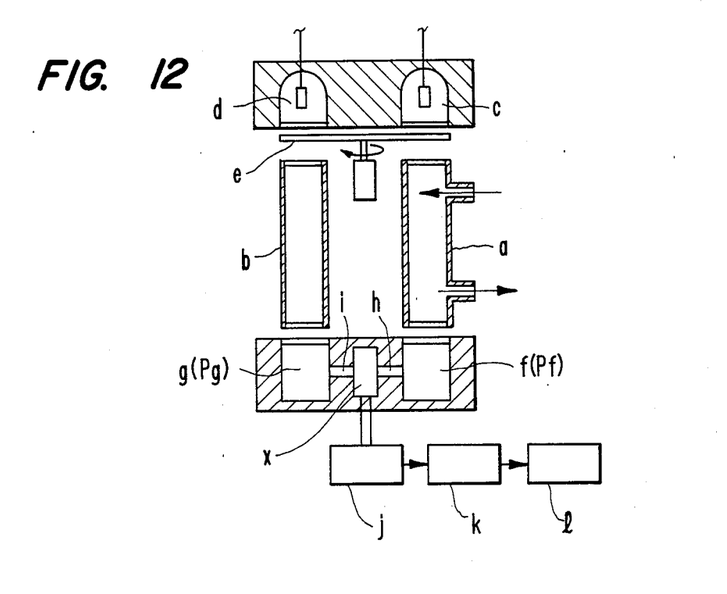
FIG. 12 is a rough block diagram showing a general infrared gas analyzer.

FIG. 12 is a schematic drawing showing one example of a general infrared gas analyzer. Referring now to this drawing, it has a measuring cell a into which a sample gas is continuously introduced, a reference cell b in which an inert gas (for example a $N_2$-gas or the like) is enclosed, a light source d for directing infrared rays onto said measuring cell a, and said reference cell b, respectively, a chopper e for periodically interrupting light from said light sources c and d, and a light-receiving chamber g upon which light which has passed through said measuring cell a and said reference cell b, respectively, is incident. A gas, which absorbs the energy of an incident infrared ray and is thus caused to be expanded, is enclosed in said light-receiving chambers f and g. A condenser-type microphone detector x for detecting a differential pressure between the two light-receiving chambers f and g is mounted between the two chambers. The pressure $P_f$ of the light-receiving chamber f and the pressure $P_g$ of the light-receiving chamber g is applied to said condenser-type microphone detector x through ducts h and i, respectively. The resulting differntial pressure signal is taken out and supplied to an outside circuit consisting of an amplifier j, a recorder k, an indicator l and the like.

Condenser-type microphone detectors having the following construction have been used for said condenser-type microphone detector x, functioning as said differential pressure-detecting means.

Figure 13A:
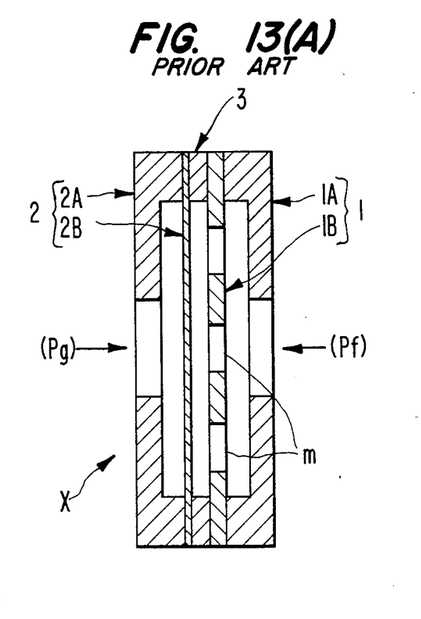
FIG. 13(A) is a longitudinal sectional view of a condenser microphone type detector having the most basic conventional construction.
Figure 13B:
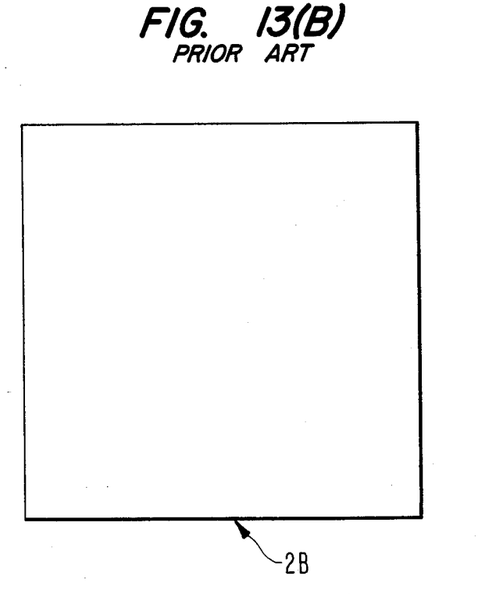
FIG. 13(B) is an elevation view showing a diaphragm forming a principal part of the detector of FIG. 13(A)

FIGS. 13(A) and 13(B) show such a detector having the most basic construction. As shown in FIG. 13(A), a fixed electrode 1 is provided which serves as a standard electrode, has a fixed electrode plate 1B provided with at least one air hole or slit m therein and electrode plate 1B is mounted on a first electrode-supporting base 1A. Base 1A is connected to the duct h carrying the pressure $P_f$ from said one light-receiving chamber f. A movable electrode 2 is provided in which a diaphragm 2B formed of a simple thin metallic film, for example a titanium film, as shown also in FIG. 13(B), is mounted on a second electrode-supporting base 2A. Base 2A is connected to the duct i carrying the pressure $P_g$ from said other light-receiving chamber g. The diaphragm 2B acts as a pressure-receiving and dislocating member which is transformed and dislocated by the differential pressure $P_g - P_f$ between said light-receiving chambers f and g. An insulating spacer 3 is mounted between the diaphragms 2A and 2B to keep them in spaced opposed relationship.

However, with a condenser-type microphone detector x having such a conventional construction, since the diaphragm 2B which acts as the pressure-receiving and dislocated member of the movable electrode 2 has been formed of the simple metallic thin film, as above described, the tensile stress on the film can not help but be increased during deformation. Accordingly, there is a limit to the dislocation due to the differential pressure $P_g - P_f$ which can not be increased, so that a compact and highly sensitive diaphragm 2B can not be obtained. In addition, since in order to give a uniform tensile force to the film during the deformation of the diaphragm 2B formed of the metallic thin film on said second electrode-mounting base 2A, a manual operation requiring great skill is necessary, and problems have also occurred in that a mass production is difficult and the manufacturing cost is very high.

Figure 14A:
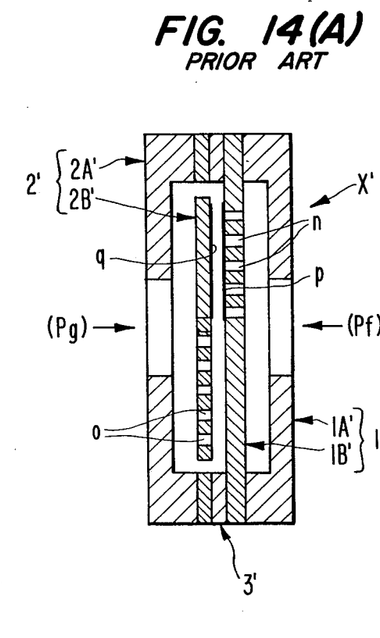
FIG. 14(A) is a longitudinal sectional view of a condenser microphone type detector havcing another conventional construction.
Figure 14B:
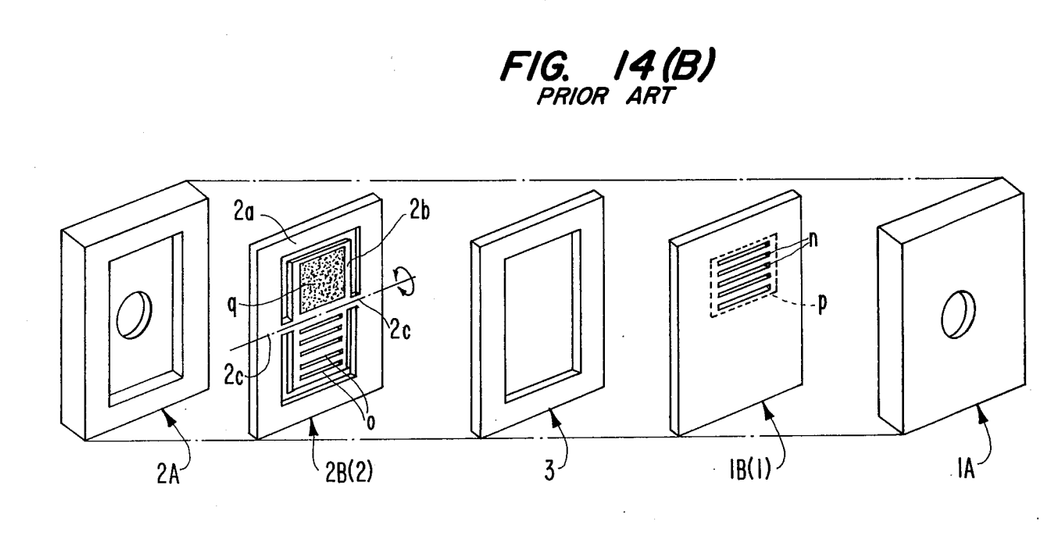
FIG. 14(B) is an exploded perspective view showing the detector of FIG. 14(A).

A condenser-type microphone detector x' having a different construction has been recently proposed in, for example, Japanese Patent Application Laid-Open No. 133323/1985, and thus is shown in FIGS. 14(A) and 14(B). As shown in FIGS. 14(A) and 14(B), a fixed electrode 1' is provided which serves as a standard electrode. It has an insulating plate-like member 1B' provided with a large number of air holes or slits n formed in one half thereof, the upper half in this drawing, and an electrode plate p attached to an interior side thereof. A movable electrode 2' is provided which is formed of a diaphragm 2B' which serves as a pressure-receiving and dislocatable member, and which has an insulating plate-like member 2B' having a central movable portion 2b internally connected through two supporting portions 2c to an outside circumferential fixing portion 2a so as to be rotatable relative thereto. The plate-like member 2B' has a large number of air holes or slits o in one half thereof (the lower half in this drawing) and an electrode plate q is formed on the interior side of the upper half by plating, vapor coating or the like. The interior sides of plates 1B' and 2B' face each other, and the plates are fixedly held between a first electrode-supporting base 1A' connected to a duct h for receiving a pressure $P_f$ from said one light-receiving chamber f, and a second electrode-supporting base 2A' connected to a duct i for receiving a pressure $P_g$ from the other light-receiving chamber g, and are spaced by a spacer 3' so as to have a desired distance therebetween.

In a condenser-type microphone detector x' having such a construction, since the diaphragm 2B' acting as the pressure-receiving and dislocatable member of the movable electrode 2' has the central movable portion 2b rotatable around the two supporting portions 2c, it can be very highly sensitive and relatively compact in comparison with a detector having the above described basic construction as shown in FIGS. 13A and 13B, and does not have the deficiency due to the tensile force on the thin metallic film.

However, since a very large twisting resistance is required at said two rotary supporting portions 2c it is quite useless to form the diaphragm 2B' of a thin metallic film. In practice, it is formed of a quartz crystal which is an insulating material. Accordingly, its manufacture requires a very difficult and time-consuming micro forming technique, such as anisotropic etching, and it requires an additional installation step for the separate electrode plate q, so that it is unsuitable for mass production. In addition, since a quartz crystal having a high brittleness must be used, there is a problem particularly with respect to the endurance of the two rotary supporting portions 2C.

SUMMARY OF THE INVENTION

This and other objects of the invention will become apparent from the following description taken with the accompanying drawings, in which:

The present invention has been made to overcome the above described problems with conventional detectors.

Thus, it is an object of the present invention to provide a diaphragm for use in a condenser-type microphone detector which is sufficiently sensitive in spite of having a very compact construction and which can be inexpensively manufactured by mass production techniques.

DETAILED DESCRIPTION OF THE INVENTION AND PREFERRED EMBODIMENTS

Figure 1:
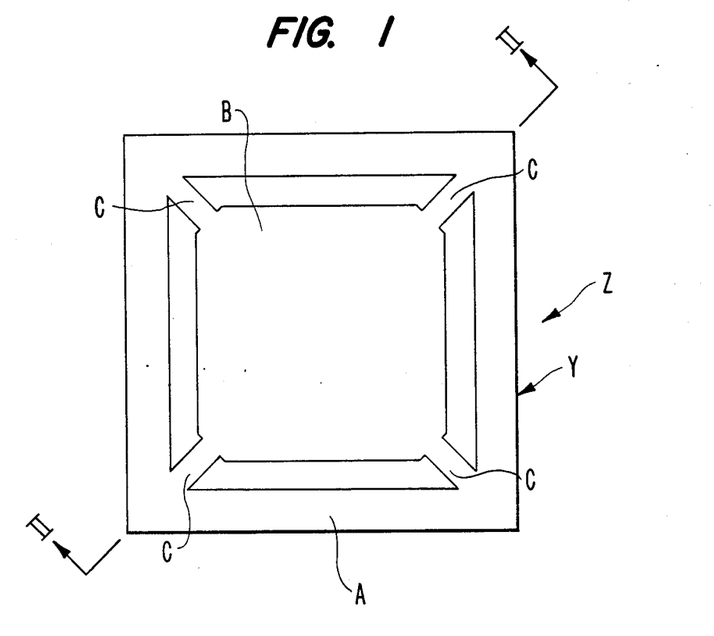
FIG. 1 is a front view of the basic construction of a diaphragm for use in a condenser microphone type detector according to the present invention.

This and other objects of the invention will become apparent from the following description taken into the accompanying drawings, in which:

As shown in FIG. 1, a diaphragm Z for use in a condenser-type microphone detector according to the present invention is formed of a piece of thin metallic film Y with a central movable portion B is connected to an outside circumferential supporting frame portion A by at least three supporting spring portions C which permit dislocation of the central movable portion B out of the plane of said supporting portions A.

Figure 2:
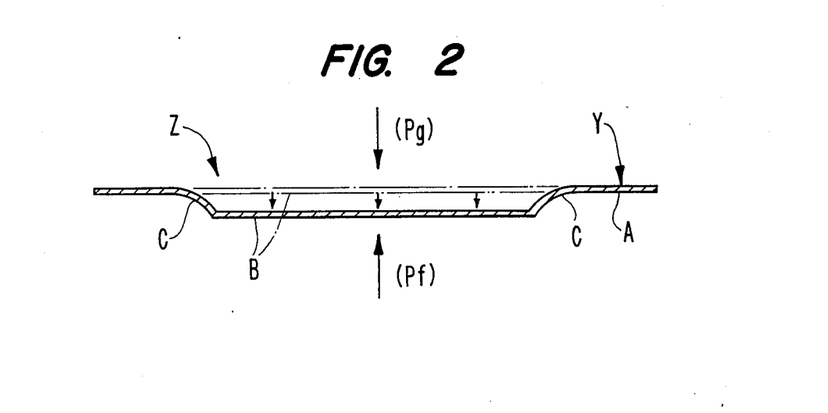
FIG. 2 is a sectional view taken along a line II—II of FIG. 1 for describing the operation of the diaphragm as shown in FIG. 1.

The effects which the above described construction exhibit are as follows:

The diaphragm Z for use in the condenser-type microphone detector according to the present invention, as shown also in FIG. 2, is not formed of a simple thin metallic film as is the conventional construction as described in FIG. 13(B). Even though the diaphragm is formed of a piece of thin metallic film member Y as a whole, its outside circumferential portion acts as a supporting portion A and its central portion is formed as a movable portion B which can be transformed and dislocated by a differential pressure $P_g - P_f$ between the two sides thereof. Moreover, the central movable portion B is adapted to be supported only by three or more supporting spring portions C. Each portion C is plate-shaped spring-like member in this basic example. As a result, the diaphragm Z can be fixedly mounted in the detector by means of the outside circumferential fixing portion A very easily, and the tensile force on the film in the central movable portion B can be made very small and uniform, whereby even though the differential pressure $P_g - P_f$ between the two sides of the central movable portion B is very small, a comparatively large flexure as well as a comparatively large elongation is produced in the supporting spring portions C to permit the central movable portion B to dislocate a large amount. Accordingly, the diaphragm Z can be made very sensitive in spite of its great compactness. In addition, if each of said supporting spring portions C is not formed in the plate-shaped spring-like form as in this basic example, but in a flat coil spring-like form having a small flexural rigidity and which is twist-stretchable so as to have a very large longitudinal elongation, as shown in a preferred embodiment which will be described later, the diaphragm Z can be made still more compact and more highly sensitive.

An addition, since the central movable portion B of the diaphragm Z according to the present invention is not supported by only two twist-supporting portions so as to be rotable and dislocatable as is the conventional construction as described with reference to FIG. 14(B), but rather spring portions C, for example three or more twist-stretchable supporting spring portions C, so as to be dislocatable out of the plane of the supporting frame portion in an axial direction of the detector, even though the diaphragm Z is formed of a piece of thin metallic film Y as a whole, it can be made sufficiently strong. In addition, since the diaphragm Z itself can be used also as an electode plate by forming the diaphragm Z of a piece of this metallic film Y in the above described manner, the construction of diaphragm Z can be greatly simplified and be manufactured very easily. Moreover, a large number of diaphragms Z, for example a sheet with several tens of diaphragms Z, can be manufactured at one time and in a short time by a relatively easy micro working technique such as electroforming which is recently making rapid progress. Accordingly, a remarkable reduction of cost can be easily achieved by such mass production.

Various preferred embodiments according to the present invention are described below with reference to FIGS. 3 to 11.

Figures 3, 4:
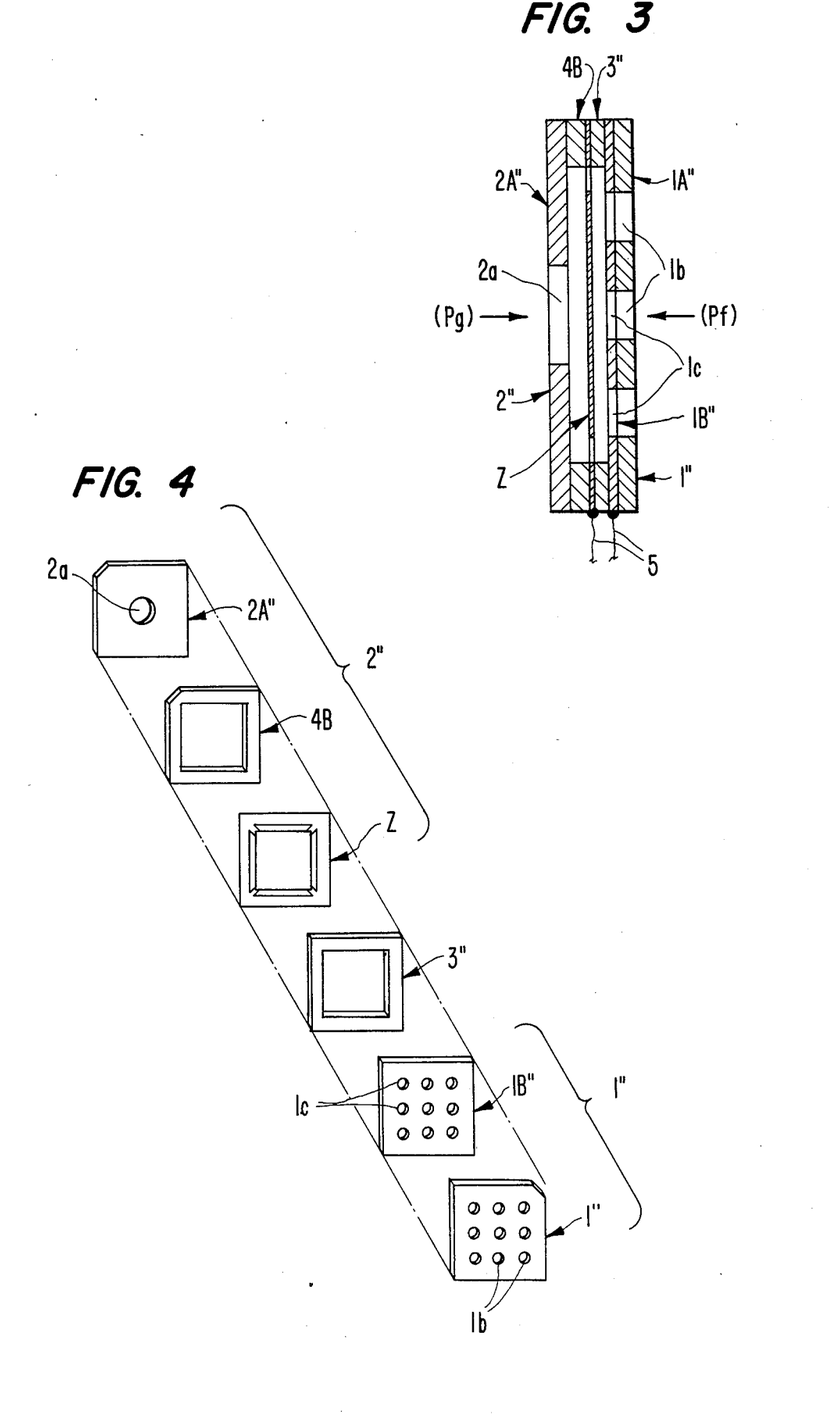
FIG. 3 is a longitudinal sectional view of a first preferred embodiment of standard fixed electrode type condenser microphone type detector constructed using a diaphragm according to the present invention.
FIG. 4 is an exploded perspective view showing the detector of FIG. 3.
Figure 5:
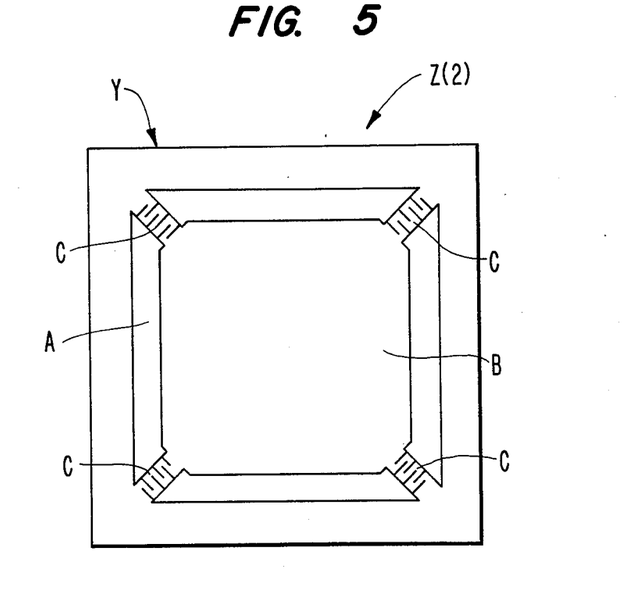
FIG. 5 is a front view on an enlarged scale of a diaphram forming a principal part of the detector of FIG. 4.
Figure 6:
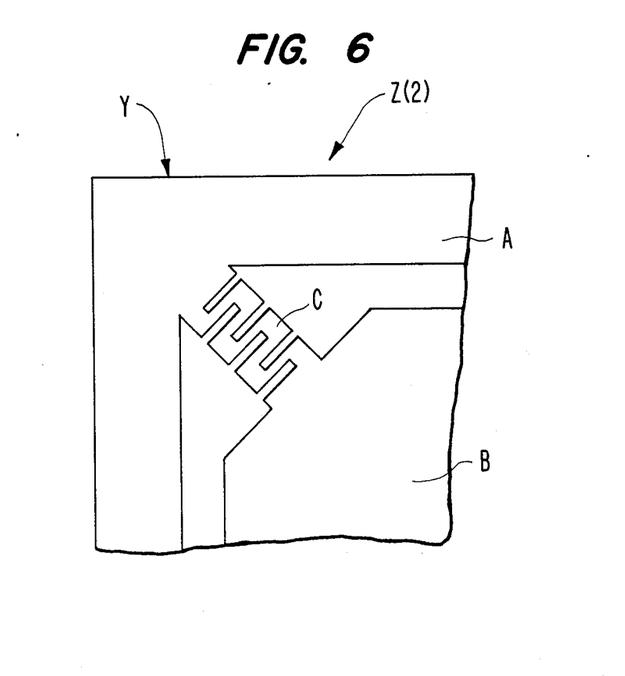
FIG. 6 is a front view of a still further enlarged scale showing a part of diaphragm of FIG. 5.

FIG. 3 and FIG. 4 show a standard fixed electrode condenser-type microphone detector constructed using a diaphragm according to the present invention, and in this standard detector is a standard electrode constituted by a fixed electrode 1" having a fixed electrode plate 1B" provided with a large number of air holes 1C aligned with air holes 1B in a first electrode-supporting base 1A" which is a simple plate-like member provided with a large number of air holes 1B exposed at one side to pressure $P_f$. An insulating spacer 3" is mounted on the opposite side of electrode plate 1B". A movable electrode 2" is constituted by a diaphragm Z which is a pressure-receiving and dislocatable member having a construction as shown in FIG. 5 which will be described later, and which is against spacer 3, a spacer 4B" against the other side of diaphragm Z, and a second electrode-supporting base 2A" in the form of a simple plate-like member provided with one large air hole 2A connected to pressure $P_g$. The fixed electrode 1" and the movable electrode 2" are fixedly mounted in spaced opposed relation with a desired space therebetween. Leads 5 are connected to electrodes 1B" and Z to take out signals therefrom.

The diaphragm Z which is part of the movable electrode 2 is formed of a piece of thin metallic film Y, for example nickel or the like, by using a relatively easy micro working techniques such as electro-forming or a photo-etching. As shown in FIG. 5, it has an outside circumferential supporting frame portion A, a central movable portion B which can be dislocated by a differential pressure $P_g - P_f$ between the two sides thereof, and the central movable portion B being supported on supporting frame portion A by supporting spring portions C at each of the four corners of portion B. Each of the supporting spring portions C is for example, a flat zig-zag spring, shown on an enlarged scale in FIG. 6, which can easily twist in a direction perpendicular to the plane thereof and easily stretch in the longitudinal direction, so that even though the differential pressure $P_g - P_f$ between the two sides of the central movable portion B is very small, comparatively large flexure and elongation of the supporting spring portions C occur to permit the central movable portion B to be dislocated a large amount, thereby providing a very high sensitivity to differential pressure.

Figures 7, 8:
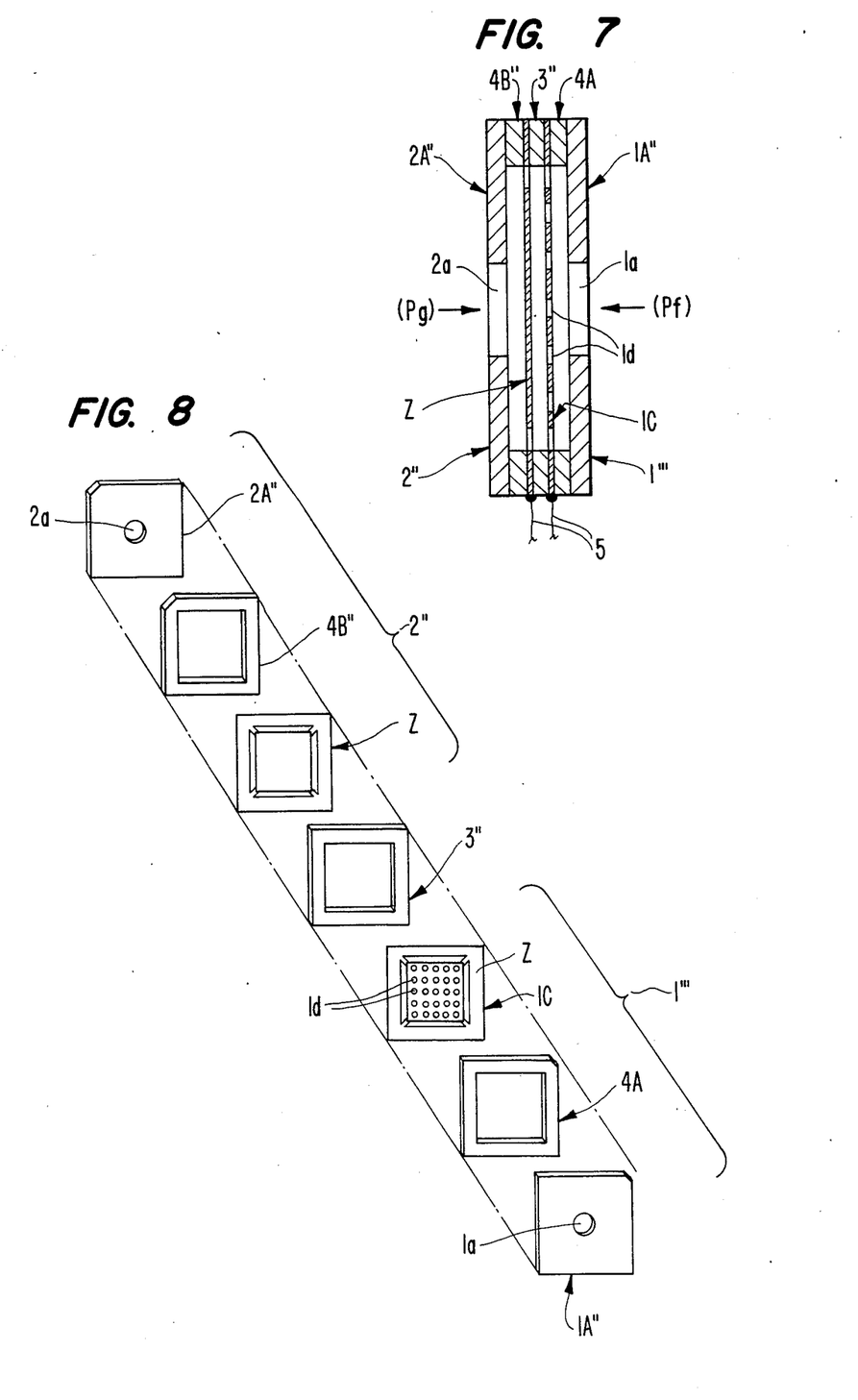
FIG. 7 is a longitudinal sectional view of a second preferred embodiment of a standard fixed electrode-type condenser microphone type detector constructed using a modified form of the diaphragm according to the present invention.
FIG. 8 is an exploded perspective view showing the detector of FIG. 7.

FIGS. 7 and 8 show a movable electrode condenser type microphone detector using an additional modified form of diaphragm according to the present invention.

Figure 9:
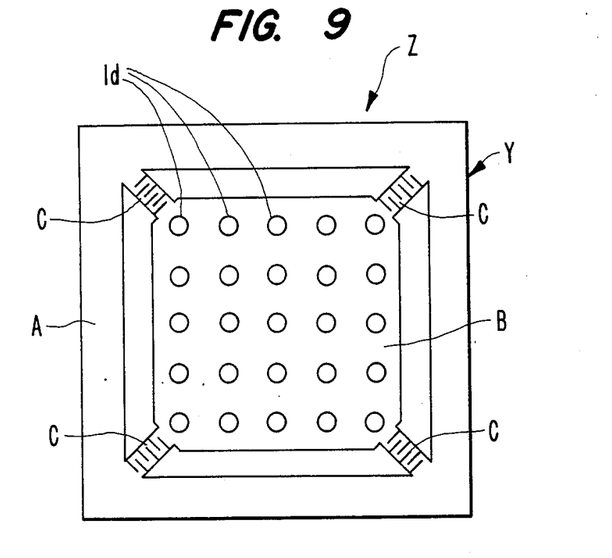
FIG. 9 is a front view on an enlarged scale of a diaphragm forming a principal part of the detector of FIG. 8.

In this preferred embodiment the detector is adapted to respond to disturbance, such as vibration, which acts on the detector. To this end the electrode 1C of the electrode 1" of the detector of FIGS. 3 and 4 is replaced by a movable electrode 1C forming part of the electrode 1''', and which is capable of vibrating in the same manner as the diaphragm Z of the movable electrode 2" for detecting the differential pressure. The electrode 1C is constituted by a diaphragm Z, according to the present invention which automatically compensates for a detection error resulting from a disturbance such as vibration. As shown in FIG. 9, the diaphragm Z, constituting the movable electrode 1C has the same supporting frame portions A and springs C as the diaphragm 2, but the central movable portions B is provided with a large number of air holes 1D which also can be slits, for suppressing a response resulting from the differential pressure $P_g - P_f$ between the two sides thereof. In addition, a spacer 4A is provided between the movable electrode 1C and the first electrode-supporting base 1A". The remainder of the construction is the same as the above described embodiment of FIGS. 3 and 4.

Figure 10:
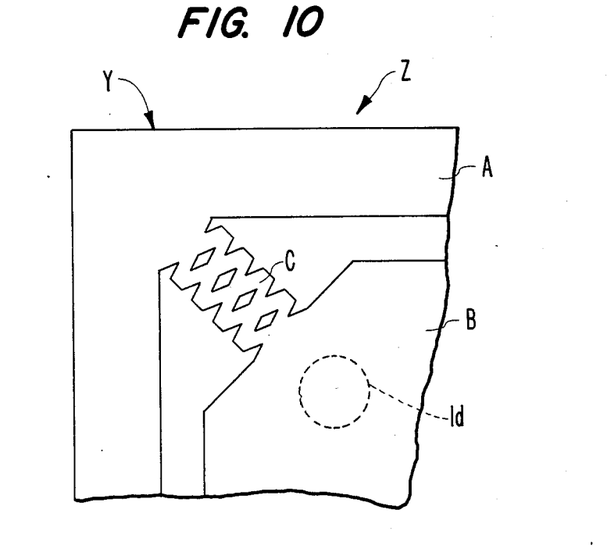
FIG. 10 is a front view on a still further enlarged scale showing a part of the diaphragm of FIG. 9.
Figure 11A:
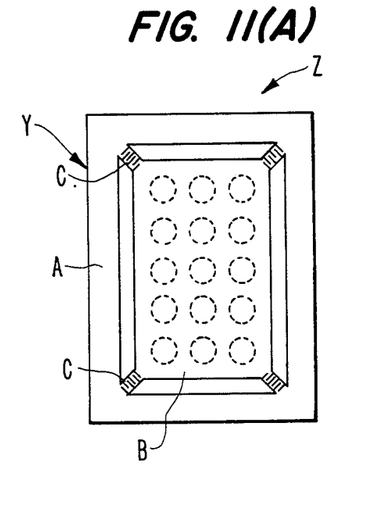
FIGS. 11(A) to 11(E) are front views showing modifications of said diaphragm, respectively.
Figure 11B:
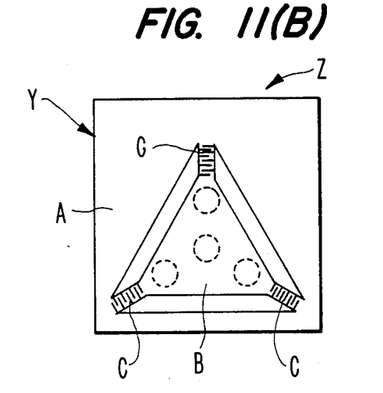
Figure 11C:
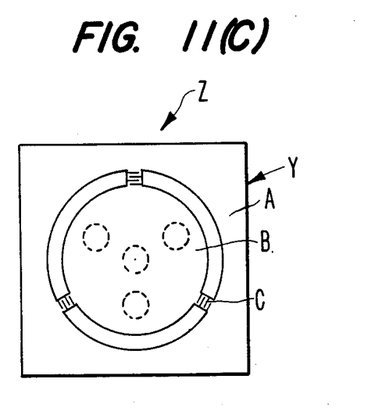
Figure 11D:
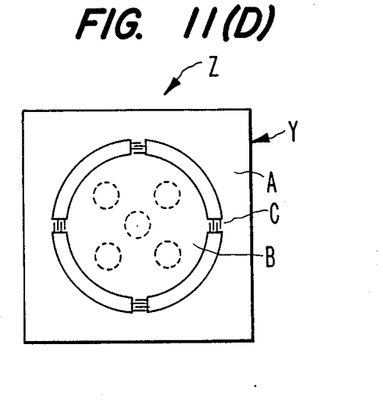
Figure 11E:
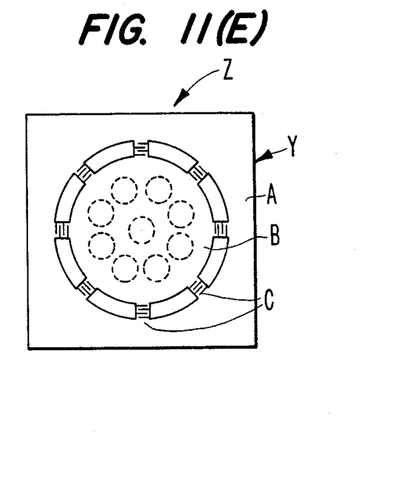

FIG. 10 shows a modified form of a flat zig-zag spring constructing for supporting spring portions C in the diaphragm Z. This can best be described as a double zig-zag flat spring, i.e. one in which two zig-zag flat springs extended back and forth across each other.

FIGS. 11(A) to 11(E) show modifications of the diaphragm according to the present invention. As shown in these figures, a shape of the central movable portion B and the surrounding supporting frame portion A is not limited to a regular square. Various shapes, such as rectangular, triangular and circular, can be used. For ease of construction the opening in the center of the supporting frame portions has a shape complementary to the shape of the central movable portion B. Also the number of supporting spring portions C for supporting the central movable portion B can be three or more. However, in order that the central movable portion B has all the portions thereof dislocated an equal distance, the supporting spring portions C are positioned at regular intervals around the supporting frame portion. Moreover, when the modified diaphragms are to be used as the electrode plate of the fixed electrode, they preferably have holes therein, as shown in the FIG. 9 embodiment.

Although the diaphragm Z according to the present invention was developed for a condenser microphone type detector which is mainly mounted in a non-dispersion type infrared analyzer for analyzing a gas, it goes without saying that because of its superior performance, it can also be used in other sensors, for example, a micro differential pressure sensor, a micro flow sensor and the like.

As is clear from the above detailed description, the microphone type detector is characterized by having a thin metallic film member with a central movable portion mounted in supporting frame portions by three or more supporting spring portions so as to be dislocatable out of the plane of the supporting frame portions in the axial directions of the detector, whereby superior effects are exhibited, namely the diaphragm can be very sensitive to pressure changes in spite of its remarkable compactness, and it is inexpensive to manufacture by mas production methods.

What is claimed is:

1. A diaphragm for use as a pressure receiving and dislocatable member in a condenser-type microphone detector, comprising:
   a thin metallic film member having;
   a central movable portion;
   a supporting frame portion around the outside of and spaced from said central movable portion; and
   at least three supporting spring portions at equal intervals around the periphery of said central movable portion and connected between said central movable portion and said supporting frame portion for permitting said central movable portion to be moved out of the plane of said supporting frame portion by differential pressure across the opposite sides of said central movable portion.

2. A diaphragm as claimed in claim 1 in which said central movable portion has a square shape.

3. A diaphragm as claimed in claim 1 in which said central movable portion has triangular shape.

4. A diaphragm as claimed in claim 1 in which said central movable portion has a circular shape.

5. A diaphragm as claimed in claim 1 in which said central movable portion has a plurality of holes therethrough.

6. A diaphragm as claimed in claim 1 in which said spring portions are each a flat zig-zag spring.

7. A diaphragm as claimed in claim 1 in which said spring portions are each a flat double zig-zag spring.

8. A condenser-type microphone detector for sensing a pressure differential, comprising: a first electrode supporting base having an opening therein for receiving pressure from a first pressure source, and an electrode formed of a thin metallic sheet and mounted on said first electrode supporting base and having a plurality of holes therein having a central movable portion, a supporting frame portion around the outside of and spaced from said central movable portion and attached to said first electrode supporting base for mounting said electrode thereon, and at least three supporting spring portions at equal intervals around said central movable portion and connected between said central movable portion and said supporting frame portion for permitting said central movable portion to be moved out of the plane of said supporting frame portion by differfential pressure across opposite sides of said central movable portion;

a second electrode supporting base having an opening therein for receiving pressure from a second pressure source, and a further electrode formed of a further thin metallic sheet and mounted on said second electrode suppoting base and having a further central movable portion in spaced opposed relation to said central movable portion, a further supporting frame portion around the outside of and spaced from said further central movable portion and attached to said second electrode supporting base for mounting said further electrode thereon, and at least three further supporting spring portions at equal intervals around said further central movable portion and connected between said further central movable portion and said further supporting frame portion for permitting said further central movable portion to be moved out of the plane of said further supporting frame portion by differential pressure across opposite sides of said further central movable portion; and a spacer between said two electrodes for maintaining the spacing therebetween, whereby when said detector is disturbed by vibrations, said electrodes can move together for accurately detecting the pressure differential.

* * * * *